US006222442B1

(12) United States Patent
Gager et al.

(10) Patent No.: US 6,222,442 B1
(45) Date of Patent: Apr. 24, 2001

(54) VEHICLE TRUNK COMPARTMENT EMERGENCY RELEASE AND WARNING SYSTEM AND METHOD

(75) Inventors: Robert Brady Gager, Flushing; Andrew Michael Rheude, Grand Blanc; Larry R. Carley; Neuman C. Convis, both of Burton, all of MI (US)

(73) Assignee: Delphi Technologies, Inc,, Troy, MI (US)

( * ) Notice: Subject to any disclaimer, the term of this patent is extended or adjusted under 35 U.S.C. 154(b) by 0 days.

(21) Appl. No.: 09/280,945

(22) Filed: Mar. 29, 1999

(51) Int. Cl.[7] .................................................... B60R 25/10

(52) U.S. Cl. ....................... 340/426; 340/425.5; 340/438; 340/573.1; 307/10.1; 307/10.2; 70/92

(58) Field of Search .................................... 340/426, 457, 340/438, 425.5, 573.1, 471, 468, 542, 531, 532, 533; 307/10.1, 410.2, 10.8; 70/92

(56) References Cited

U.S. PATENT DOCUMENTS

| | | | | |
|---|---|---|---|---|
| 5,859,479 | * | 1/1999 | David | 340/471 |
| 6,018,292 | * | 1/2000 | Penny, Jr. | 340/426 |
| 6,086,131 | * | 7/2000 | Bingle et al. | 296/76 |
| 6,091,322 | * | 7/2000 | Ang et al. | 340/425.5 |

* cited by examiner

*Primary Examiner*—Nina Tong
(74) *Attorney, Agent, or Firm*—Jimmy L. Funke

(57) ABSTRACT

In a preferred embodiment, an apparatus for detecting the presence of, and providing for the release of, a person in a vehicle trunk compartment, including: a presence detector system to detect motion in the vehicle trunk compartment; and upon detection of motion in the vehicle trunk compartment, the presence detector system causes the activation of one or more functions selected from the group consisting of: a vehicle operator alert, vehicle headlights, a vehicle horn, a vehicle alarm, a self-contained alarm, a trunk lid release and, a trunk light.

11 Claims, 3 Drawing Sheets

VEHICLE TRUNK COMPARTMENT EMERGENCY RELEASE AND WARNING SYSTEM AND METHOD

BACKGROUND OF THE INVENTION

1. Field of the Invention

The present invention relates to vehicles generally and, more particularly, but not by way of limitation, to a novel vehicle trunk emergency release and warning system and method that release a trunk latch and warn the vehicle operator of the presence of a person locked in the trunk.

2. Background Art

While the present invention is described, for illustrative purposes, with reference to detecting the presence of a person in a vehicle trunk compartment, it will be understood that the present invention is applicable, as well, to any situation in which it is desirable to detect the presence of a person in any locked enclosure.

To avoid injury or death to a person, particularly a child, that becomes locked in the trunk compartment of a vehicle, it is important that means be provided to open the locked trunk either automatically or by the person locked in the trunk compartment. Recent media reports emphasize the need for such a provision and considerations of associated vehicle safety legislation further emphasize this need.

One method of providing for the release of a person locked in a vehicle trunk compartment is simply to provide an internal catch that the person in the trunk can activate to unlatch the trunk lid. A disadvantage of this method, however, is that the person must be able to locate the internal catch and be able physically to activate the catch, which a child or disabled or adult may not be able to do. For this reason, it is desirable that the presence of the person be detected and the trunk automatically unlatched. An undesirable aspect of this, on the other hand, is that the trunk lid may be unlatched when the vehicle is in motion. In any case, it is desirable that the presence of the person be made known to others, such as the operator of the vehicle, so that appropriate action can be taken if the lid fails to be unlocked or if the vehicle is in motion.

Accordingly, it is a principal object of the present invention to provide a system and method for detecting the presence of a person in the trunk compartment of a vehicle and, subject to certain limitations, automatically unlocking the lid of the trunk compartment upon such detection.

It is a further object of the invention to provide such a system and method that alert others to the presence of the person locked in the trunk compartment of the vehicle.

It is an additional object of the invention to provide such a system and method that will not unlock the trunk compartment of the vehicle if the vehicle is in motion or may be put in motion.

It is an additional object of the invention to provide such a system and method that permit, subject to certain limitations, the person in the trunk of the vehicle to unlock the lid of the trunk compartment from the inside of the trunk compartment.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an apparatus for detecting the presence of, and providing for the release of, a person in a vehicle trunk compartment, comprising: a presence detector system to detect motion in the vehicle trunk compartment; and upon detection of motion in the vehicle trunk compartment, the presence detector system causes the activation of one or more functions selected from the group consisting of: a vehicle operator alert, vehicle headlights, a vehicle horn, a vehicle alarm, a self-contained alarm, a trunk lid release, a trunk light, and a trunk lid release.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
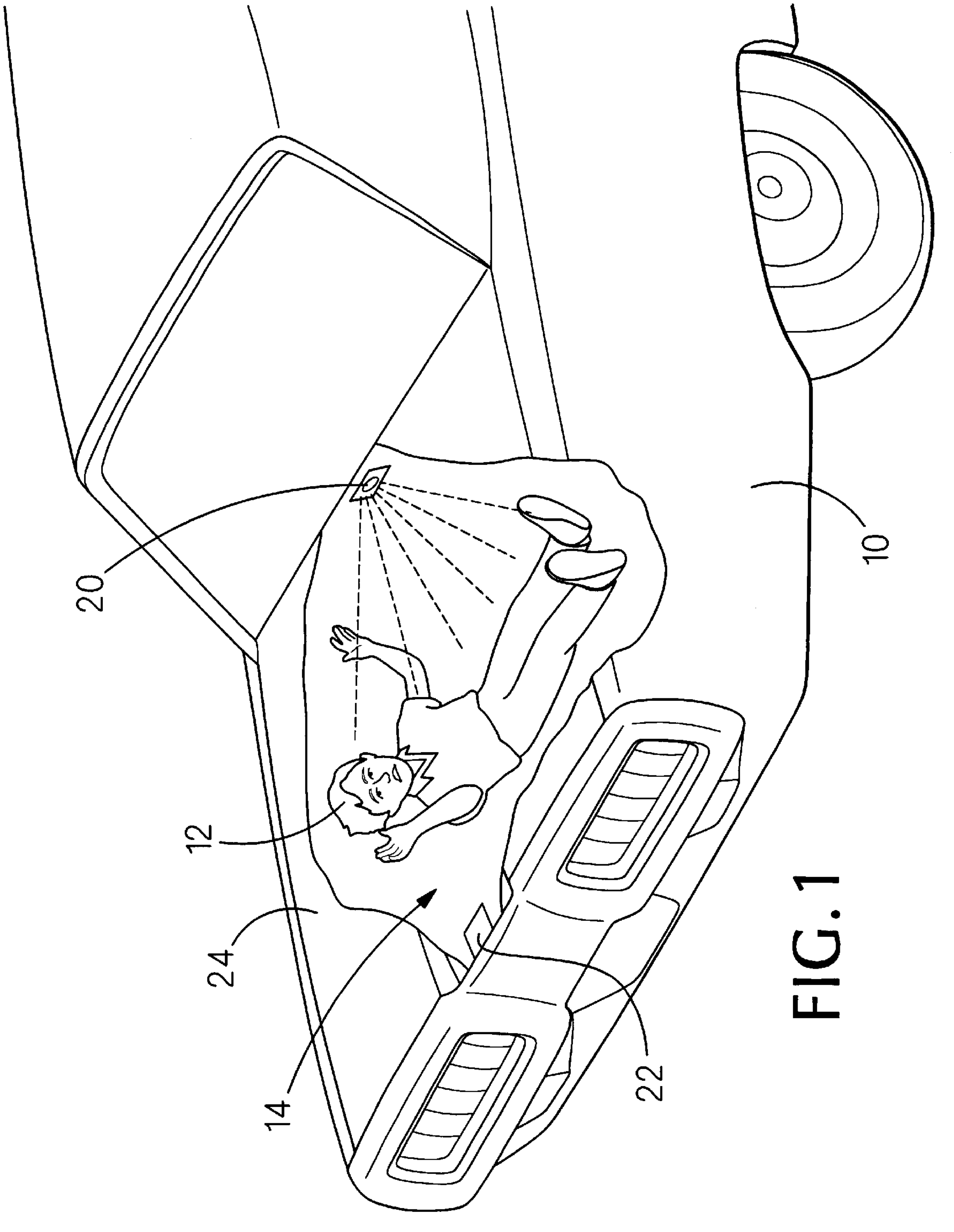
FIG. 1 is a fragmentary, isometric view, partially cutaway, of a vehicle with a person locked inside the trunk compartment of the vehicle.

Reference should now be made to the drawing figures on which similar or identical elements are given consistent identifying numerals throughout the various figures thereof, and on which parenthetical references to figure numbers direct the reader to the view(s) on which the element(s) being described is (are) best seen, although the element(s) may be seen on other figures also.

FIG. 1 illustrates a vehicle 10 with a person, for example a child 12, locked in the trunk compartment 14 of the vehicle. According to the present invention, there is provided within trunk compartment 14 a presence detector 20 to detect the presence of, for example, child 12 and to initiate action which may, subject to certain limitations which are described in detail below, lead to the unlocking of a latch 22 of trunk compartment lid 24.

Figure 2:
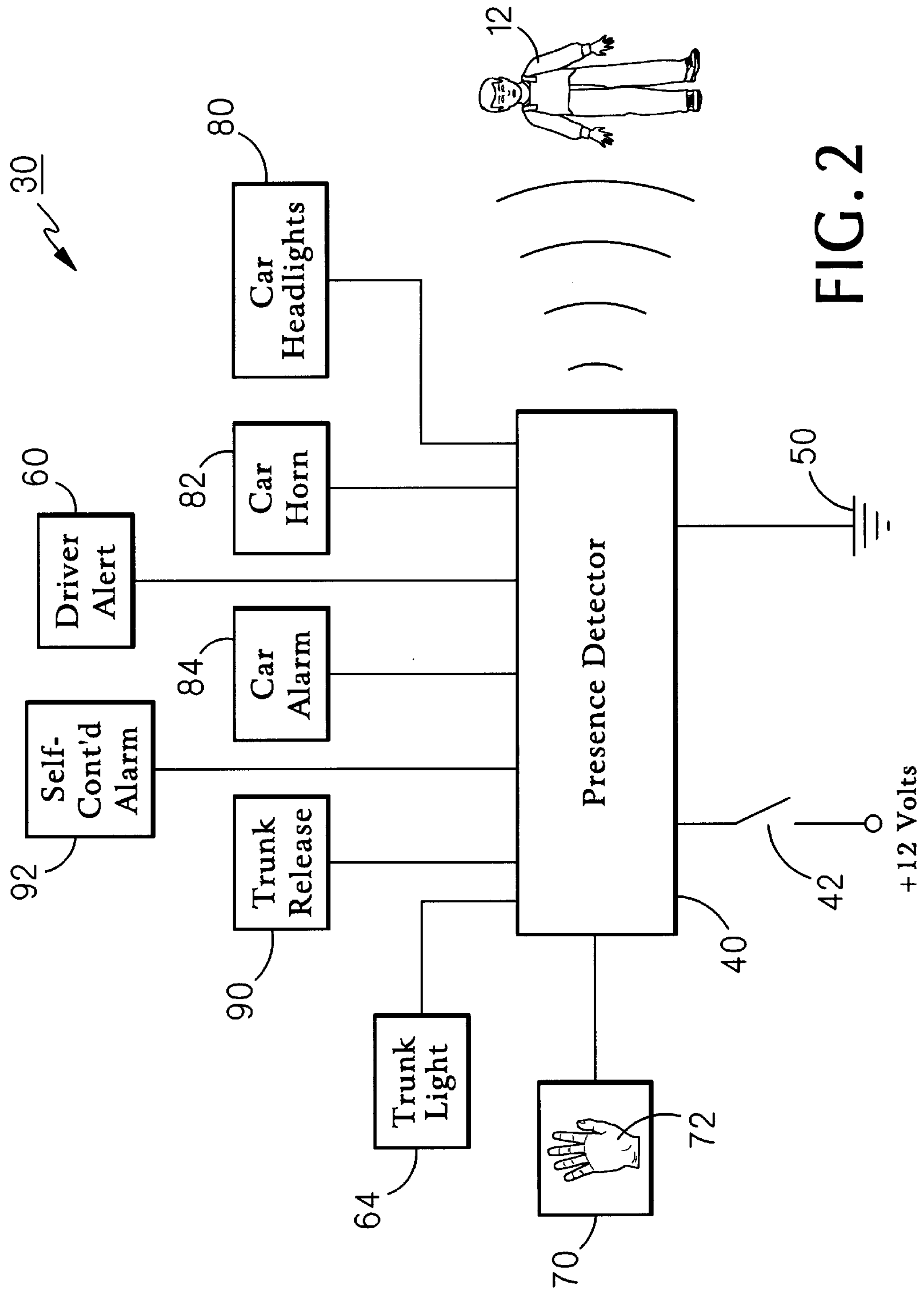
FIG. 2 is a block diagram of the system of the present invention.

FIG. 2 illustrates a vehicle emergency trunk compartment release and warning system according to the present invention, generally indicated by the reference numeral 30. System 30 includes a presence detector 40 which is supplied power from the vehicle electrical system through a key override 42, the vehicle electrical system being assumed to be operating at 12 volts, although any other voltage may be accommodated or provided through conventional means. Presence detector 40 is also connected to the vehicle electrical ground 50. Presence detector 40 may be, for example, a motion sensor, or a heat sensor such as an infrared sensor, or a sonic sensor such as an ultrasonic sound sensor, or a combination of one or more such sensors, all of which are available and well developed technically. Control circuitry may be included in presence detector 40 or it may be located remotely from the presence detector. As illustrated on FIG. 2, the control circuitry is assumed to be, for illustrative purposes only, contained within presence detector 40. Infrared and ultrasonic sensors are preferred for optical and sonic detection, since those sensors can be tuned to exclude environmental interference, although other types of optical and sonic sensors may be provided instead.

Upon detection of the presence of person in the trunk compartment, such as person 12 (FIG. 1), a number of options are possible, as described below.

First, whenever presence detector does detect person 12 in the trunk compartment, it is desirable that a driver alert 60 be activated to warn the operator of the vehicle that a person, or in any event motion, has been detected in the trunk. Driver alert 60 may consist of visual and/or audible warning means and preferably is located on or near the dashboard of the vehicle or in some other location that will attract the attention of the operator of the vehicle. It is also desirable that trunk light 64 be illuminated whenever motion is detected by presence detector 40. This will provide some level of comfort to a person locked in the trunk compartment and will also aid the person in locating a release catch. The means to activate trunk light 64 may include a timing function so that the trunk light will stay on for only a predetermined length of time to conserve battery power in case of a false motion detection condition. The length of time can be relatively long.

Upon detection, presence detector 40 may cause an internal latch release 70 to be illuminated. Latch release 70 may be illuminated, for example, with white light with a red hand 72 superimposed thereon to indicate to indicate that pressing the latch release will cause the trunk compartment lid to be unlatched. A limitation on this feature may be that the vehicle engine is turned off. Otherwise, a person might push latch release 70 when the vehicle is in motion or might push the latch release just before the vehicle is put in motion. It is also desirable for the latter reason that provision be made to lock out starting of the vehicle engine if latch release 70 is activated. Alternatively, provision may be made to unlatch the trunk compartment lid only if the vehicle is in "park" and the vehicle may not be shifted out of "park" when the trunk is open. In any case, whenever latch release 70 is pushed, whether or not the engine of the vehicle is turned on, it is desirable that driver alert 60 be activated to warn the operator of the vehicle that the presence of the person has been detected. In the case of the disabling of engine starting or shifting out of "park" is activated, additional action must be taken to remove the disable. The lighting of latch release 70 may also have be time-limited to conserve battery power.

Presence detector 40 may also cause the headlights 80 of the vehicle to be illuminated or to flash on and off when the presence of a person is detected. This is important when the vehicle is unattended or when the operator fails to notice driver alert 60 or the feature may provide redundancy if the driver alert fails to operate properly. In any case, headlights 80 will attract attention of others to the vehicle and the person locked in the trunk of the vehicle will have the opportunity to make his or her presence known to others. This function may also be time-limited.

As described above with reference to headlights 80 of the vehicle, car horn 82 and/or car alarm 84 of the vehicle may be activated to attract others to the vehicle. Again, this function may be time-limited to conserve battery to power.

Presence detector 40 may also automatically activate trunk compartment lid release 90 upon detection of person 12, preferable within the limitations described above, such as not activating the trunk release when the engine of the vehicle is running or unless the vehicle is in "park".

Other than manual latch release 70 and presence sensor 40, the elements described above are commonly provided on modern vehicles and system 30 can allow for easy interfacing with existing electric trunk release systems, thereby permitting retrofitting in aftermarket applications. For those vehicles without car alarm 84, presence sensor 40 could be provided with self-contained alarm 92 as an additional safety feature.

Key override 42 is preferably dashboard-mounted so that a vehicle operator can conveniently override system 30 when the vehicle operator must transport material in the trunk compartment that would activate the system, such as loose material that is likely to shift while the vehicle is in motion. Key override 42 is most practical for OEM applications and could default to "activated" status at the end of each vehicle ignition cycle. There may also be some visual indication provided to indicate to the operator of the vehicle that key override 42 has been activated.

Rather than reactively open the trunk compartment lid, presence detector 40 can also be used to proactively prevent the trunk compartment lid from latching when motion is present within the trunk compartment. This can be accomplished by repeated activation of the opener solenoid to unlatch the trunk compartment lid until motion is no longer detected by presence detector 40. Also, the trunk compartment latch can be disabled if closing is attempted more than a predetermined number of times and is enables only after the ignition is cycled. This feature will prevent, for example, one child trying to lock another child in the trunk compartment.

A further consideration is to provide a short period of time, say, perhaps five to eight seconds, between the closing of the compartment trunk lid and the activation of the external alert features of presence system 30. The time delay period assures the operator of the vehicle that the trunk lid is securely closed. During the time delay period, the automatic trunk lid release feature 90 would be activated and, of course, anyone shut in the trunk could operate manual latch release 70 during that period, providing any other limitations were satisfied. After the time delay period, the automatic unlock feature would be disabled. This is useful, for example, in the situation in which the vehicle operator places some packages in the trunk and then returns to a store. Having the time-out period would prevent someone from noticing the return of the person to the store and then shaking the vehicle and causing the trunk lid to open. This feature also would prevent someone from randomly shaking vehicles in hopes of finding one with an automatic trunk lid unlock feature.

Figure 3:
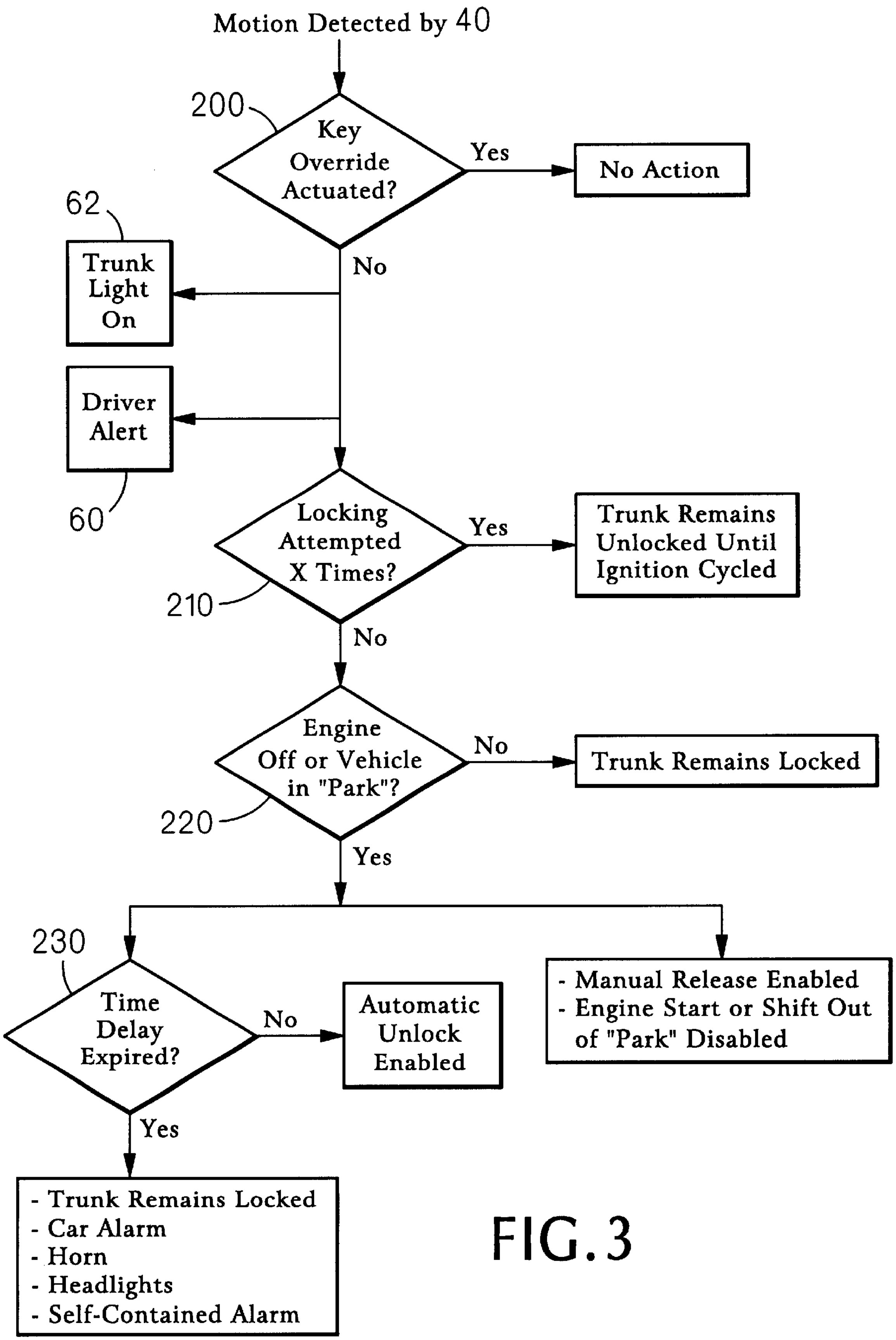
FIG. 3 is a logic flow diagram of the system of the present invention.

FIG. 3 is a logic diagram of the operation of system 30 (FIG. 2), including the various options discussed above. It will be understood, however, that certain options may be omitted. Upon detection of motion in the trunk compartment by presence detector 40, there is an inquiry at step 200 as to whether key override 42 has been activated. If key override 42 has been activated, no further action is taken. If key override 42 has not been activated, driver alert 60 is activated and trunk light 64 is turned on in response to the detection of motion. Then, there is an inquiry at step 210 as to whether locking of the trunk lid has been attempted a predetermined number of times. If the locking has been attempted the predetermined number of times, the trunk remains unlocked until the vehicle ignition is cycled. If locking of the trunk lid has not been attempted the predetermined number of times, there is an inquiry at 220 as to whether the engine is turned off or the vehicle is in "park". If the engine is not turned off or the vehicle is not in "park", the trunk lid remains locked. If the engine is turned off or the vehicle is in "park", manual release 70 is illuminated and enabled and the starting of the engine or the shifting out of "park" is disabled.

Also, if the engine is turned off or the vehicle is in "park", there is an inquiry at step 230 as to whether the time delay after closing of the trunk compartment lid has expired. As noted above, this time delay period is perhaps on the order of about five to eight seconds. If the time delay has not expired, the automatic trunk lid release feature 90 is enabled, so that the trunk lid will be unlocked if motion is detected during the time delay period. If the time delay period has expired, trunk release 90 is disabled and car headlights 80, car horn 82, car alarm 84 and self-contained alarm 92 are activated to alert others of the probable presence of a person locked in the trunk compartment.

It will be understood that the various steps described with reference to FIG. 3 do not necessarily have to be taken in the order shown. It will also be understood that the various steps described with reference to FIG. 3 are optional and that the present invention contemplates that one or more of the various steps may be omitted or altered within the spirit of the invention.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. Apparatus for detecting the presence of, and providing for the release of, a person in a vehicle trunk compartment, comprising:

(a) a presence detector mounted in said vehicle trunk to detect motion in said vehicle trunk compartment;

(b) upon detection of motion in said vehicle trunk compartment by said presence detector, a controller coupled to said presence detector and to operating elements of said vehicle causes the activation of one or more functions selected from the group consisting of: a vehicle operator alert, vehicle headlights, a vehicle horn, a vehicle alarm, a self-contained alarm, a trunk lid release, and a trunk light; and (c) said controller further comprises a first sensing means for sensing lock status of said trunk lid release and a second sensing means for sensing if there is a predetermined number of attempts made to lock said vehicle trunk compartment wherein said controller causes said vehicle trunk compartment to remain unlocked; if said first sensing means sensed said vehicle trunk compartment is in an unlocked status and if said second means sensed said predetermined number of attempts to unlock said vehicle trunk compartment.

2. Apparatus for detecting the presence of, and providing for the release of, a person in a vehicle trunk compartment, as defined in claim 1, wherein said controller permits said vehicle trunk compartment to be locked after cycling of vehicle ignition system.

3. Apparatus for detecting the presence of, and providing for the release of, a person in a vehicle trunk compartment, comprising:

(a) a presence detector mounted in said vehicle trunk to detect motion in said vehicle trunk compartment;

(b) upon detection of motion in said vehicle trunk compartment by said presence detector, a controller coupled to said presence detector and to operating elements of said vehicle causes the activation of one or more functions selected from the group consisting of: a vehicle operator alert, vehicle headlights, a vehicle horn, a vehicle alarm, a self-contained alarm, a trunk lid release, and a trunk light; and (c) said controller causes said vehicle trunk compartment to remain locked if locked and if vehicle is not in "park" or vehicle engine is not turned off.

4. Apparatus for detecting the presence of, and providing for the release of, a person in a vehicle trunk compartment, as defined in claim 3, wherein said controller disables vehicle engine starting.

5. Apparatus for detecting the presence of, and providing for the release of, a person in a vehicle trunk compartment, comprising:

(a) a presence detector mounted in said vehicle trunk to detect motion in said vehicle trunk compartment;

(b) upon detection of motion in said vehicle trunk compartment by said presence detector, a controller coupled to said presence detector and to operating elements of said vehicle causes the activation of one or more functions selected from the group consisting of: a vehicle operator alert, vehicle headlights, a vehicle horn, a vehicle alarm, a self-contained alarm, a trunk lid release, and a trunk light; and (c) upon detection of said motion in said vehicle trunk compartment by said presence detector after said vehicle trunk compartment has been closed, said controller causes said vehicle trunk compartment to automatically unlock until a predetermined time period after closing of said vehicle trunk compartment has expired.

6. Method for detecting the presence of, and providing for the release of, a person in a vehicle trunk compartment, comprising:

(a) detecting motion in said vehicle trunk compartment;

(b) upon said detecting motion in said vehicle trunk compartment, activating one or more functions selected from the group consisting of a vehicle operator alert, vehicle headlights, a vehicle horn, a vehicle alarm, a self-contained alarm, a trunk lid release, and a trunk light; and (c) upon detecting said motion in said vehicle trunk compartment, causing said vehicle trunk compartment to remain unlocked if unlocked and if a predetermined number of attempts have been made to lock said vehicle trunk compartment.

7. Method for detecting the presence of, and providing for the release of, a person in a vehicle trunk compartment, as defined in claim 6, further comprising: permitting said vehicle trunk compartment to be locked after cycling of vehicle ignition system.

8. Method for detecting the presence of, and providing for the release of, a person in a vehicle trunk compartment, comprising:

(a) detecting motion in said vehicle trunk compartment;

(b) upon said detecting motion in said vehicle trunk compartment, activating one or more functions selected from the group consisting of: a vehicle operator alert, vehicle headlights, a vehicle horn, a vehicle alarm, a self-contained alarm, a trunk lid release, and a trunk light; and (c) causing said vehicle trunk compartment to remain locked if locked and if vehicle condition is such that unlocking of said vehicle trunk compartment could lead to injury to said person.

9. Method for detecting the presence of, and providing for the release of, a person in a vehicle trunk compartment, as defined in claim 8, further comprising: disabling vehicle engine starting.

10. Method for detecting the presence of, and providing for the release of, a person in a vehicle trunk compartment, as defined in claim 8, further comprising: disabling vehicle shifting out of "park".

11. Method for detecting the presence of, and providing for the release of, a person in a vehicle trunk compartment, comprising:

(a) detecting motion in said vehicle trunk compartment;

(b) upon said detecting motion in said vehicle trunk compartment, activating one or more functions selected from the group consisting of: a vehicle operator alert, vehicle headlights, a vehicle horn, a vehicle alarm, a self-contained alarm, a trunk lid release, and a trunk light; and (c) upon detection of said motion in said vehicle trunk compartment after said vehicle trunk compartment has been closed, causing said vehicle trunk compartment to automatically unlock until a predetermined time period after closing of said vehicle trunk compartment has expired.

* * * * *